United States Patent [19]

Fujita et al.

[11] Patent Number: 4,730,581
[45] Date of Patent: Mar. 15, 1988

[54] HOLLOW CAM SHAFT

[75] Inventors: Yoshiaki Fujita, Saitama; Tatsumi Yunokawa, Tokyo, both of Japan

[73] Assignee: Nippon Piston Ring Co., Ltd., Tokyo, Japan

[21] Appl. No.: 873,604

[22] Filed: Jun. 4, 1986

[30] Foreign Application Priority Data

Jun. 18, 1985 [JP] Japan .................. 60-130773

[51] Int. Cl.⁴ .............................................. F01L 1/04
[52] U.S. Cl. .................................................. 123/90.6
[58] Field of Search .................. 123/90.6, 90.17, 90.27, 123/90.34

[56] References Cited

U.S. PATENT DOCUMENTS

| 2,397,511 | 4/1946 | Schreck | 123/90.16 |
| 3,477,417 | 11/1969 | Moulin | 123/90.38 |
| 4,265,388 | 5/1981 | Takahashi et al. | 123/90.6 |
| 4,395,980 | 8/1983 | Tominaga et al. | 123/90.27 |
| 4,592,314 | 6/1986 | Tsuchida | 123/90.4 |

FOREIGN PATENT DOCUMENTS

| 0119112 | 9/1984 | European Pat. Off. | |
| 0170378 | 2/1986 | European Pat. Off. | 123/90.6 |
| 0153622 | 1/1982 | Fed. Rep. of Germany | 123/90.6 |
| 2050207 | 1/1981 | United Kingdom | |
| 2152858 | 8/1985 | United Kingdom | |

Primary Examiner—Charles J. Myhre
Assistant Examiner—David A. Okonsky
Attorney, Agent, or Firm—Finnegan, Henderson, Farabow, Garrett and Dunner

[57] ABSTRACT

A hollow cam shaft for use in an internal combustion engine is disclosed. The cam shaft includes a steel pipe, a journal portion and a cam portion. The journal portion is provided at a part of the outer peripheral surface of the steel pipe and having an outer diameter smaller than that of the steel pipe. A cam lobe is assembled on the other portion of the outer peripheral surface of the steel pipe. The journal portion is formed by cutting the part of the outer peripheral surface of the steel pipe by a uniform axial length and radial depth.

5 Claims, 6 Drawing Figures

HOLLOW CAM SHAFT

BACKGROUND OF THE INVENTION

The present invention relates to a hollow cam shaft for use in an internal combustion engine.

Recently, an internal combustion engine has been required to be lightweight for saving energy while required to be high in its speed as well as in output. A cam shaft also has been necessarily required to be lightweight and to have superior in wear resistance.

Therefore, a variety of light weight and high wear resistance cam have been proposed each characterized by a steel pipe shaft assembled with a sintered cam piece or a sintered journal piece.

In conventional cam shafts, such as is shown in FIG. 1, a cam shaft is provided in which a journal portion 12 has an outer diameter smaller than that of a cam portion 14. In this case, the difference in diameter between a pipe 10 and the journal portion 12 is small. Such a cam shaft is disadvantageous in that the journal piece is so thin that it is extremely difficult to form by powder compacting and it is also difficult to assemble the thin journal piece with the pipe. The journal piece is easily broken because the journal piece is made of a powder compact. Therefore, in order to increase the thickness of the journal piece, it is necessary to make the diameter of the pipe small. If the pipe is reduced in diameter, the strength of the pipe becomes weaker correspondingly. In order to maintain the strength of the pipe, it is necessary to decrease the inner diameter of the pipe to obtain a thick walled pipe. Thus, the advantage of reduction in weight due to the use of a hollow pipe is diminished. Further, the cam piece becomes thicker, which leads to increased overall weight as well as increased cost of the cam shaft.

SUMMARY OF THE INVENTION

An object of the present invention is to overcome the above mentioned drawbacks and to provide an improved cam shaft.

Another object of the present invention is to provide a hollow cam shaft which lightweight and low cost to produce.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

In order to attain the above objects, and in accordance with the purpose of the invention, as embodied and broadly described herein, the hollow cam shaft according to the present invention comprises a reduced diameter steel pipe having a journal portion to which a journal member is assembled. The reduced diameter portion is formed by cutting a part of the outer periphery of the pipe by a uniform axial length. The non-cut portion of the pipe is assembled with a cam member.

Accordingly, the steel pipe acts as a shaft as well as a journal portion. The cam member is made of a sintered alloy material, or the like, which has high wear resistance property and is joined metallurgically with the steel pipe.

The accompanying drawings, which are incorporated in and constitute a part of this specification, illustrate several embodiments of the invention and together with the description, serve to explain the principles of the invention.

BRIEF DESCRIPTION OF THE DRAWINGS

FIGS. 5(a) and 5(b) show another embodiment of the present invention, wherein a cam lobe is formed with an axial projection to engage one of axial grooves formed in the outer periphery of the pipe; in which FIG. 5(a) is a front view of the cam lobe and FIG. 5(b) is a perspective view of a portion of the cam shaft.

DETAILED DESCRIPTION OF THE PREFERRED EMBODIMENTS

Reference will now be made in detail to the present preferred embodiments of the invention, examples of which are illustrated in the accompanying drawings. Wherever possible, the same reference numbers will be used throughout the drawings to refer to the same or like parts.

Figure 1:
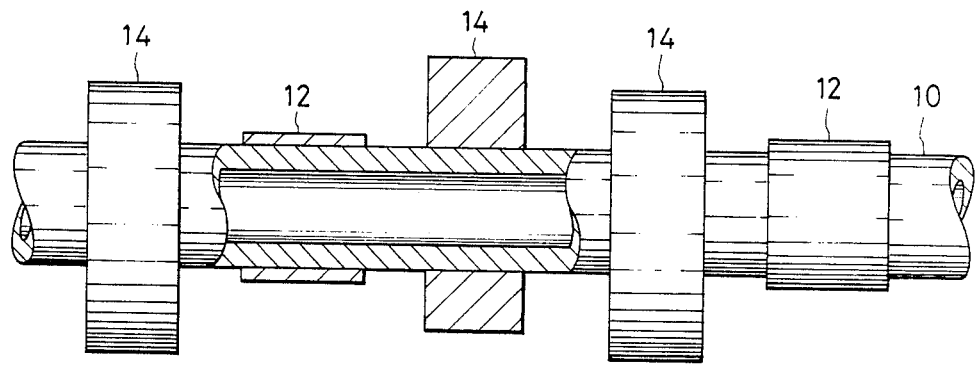
FIG. 1 is a side view sectioned in portion showing a part of a conventional hollow cam shaft.
Figure 2:
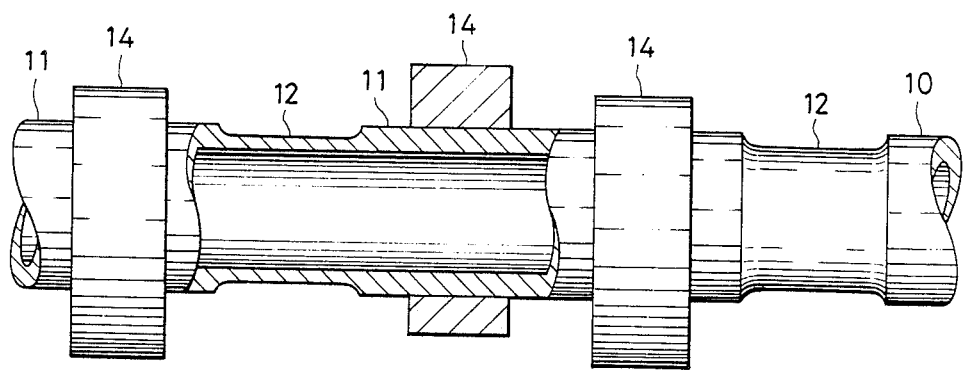
FIG. 2 is a side view sectioned in portion showing a part of an embodiment of the hollow cam shaft of the present invention.

As shown in FIG. 2, a hollow cam shaft according to the present invention includes a steel pipe 10 acting as a shaft, a journal portion 12 formed at a part of the steel pipe 10 and having an outer diameter smaller than that of the pipe 10. The journal portion 12 is formed by cutting a part of the outer peripheral surface of the pipe to a uniform axial length and depth. A cam member 14 is fittingly mounted on the pipe 10 at a non-cut portion thereof.

Though the journal portion is not required to provide superior wear resistance, the journal portion 12 may be subject to surface treatment such as carburizing, quenching, or the like, if necessary.

A sintered alloy material having a high wear resistance is suitable for the cam member 14. The cam member 14 has a fitting hole the size of which is substantially the same as the outer periphery of a large diameter portion 11 of the steel pipe 10. The cam member 14 is fittingly mounted on the steel pipe 10 at the large diameter portion 11 and then fixedly joined therebetween. Fixing the cam member to the steel pipe 10 may be diffusion bonding, by sintering brazing, caulking, or the like.

Figure 3:
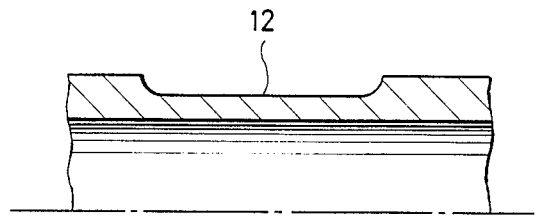
FIG. 3 is an enlarged side view in section showing a portion of an embodiment of the journal portion according to the present invention.
Figure 4:
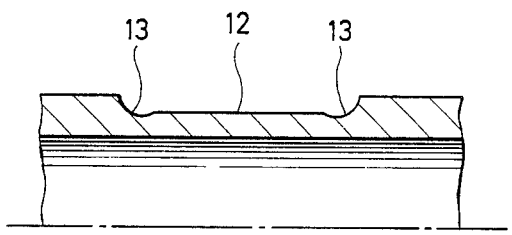
FIG. 4 is an enlarged side view in section showing a portion of another embodiment of the journal portion according to the present invention.

FIGS. 3 and 4 are enlarged views showing embodiments of the journal portion 12. In the embodiment shown in FIG. 3, the journal portion 12 is formed by cutting a portion of the outer periphery of the pipe to a uniform depth and uniform axial length.

In the alternative embodiment shown in FIG. 4, a journal portion 12 is formed in the same manner as in the above embodiment, after escape grooves 13 have been circumferentially formed in the outer periphery of the pipe 10 at portions corresponding to the opposite axial ends of the journal portion 12. These escape grooves prevent shear drop at the opposite ends of the journal portion 12 during the cutting operation.

It is necessary to determine the depth of cutting in the outer periphery of the pipe to form the journal portion 12 in view of the thickness and strength of the steel pipe 10.

Figure 5A:
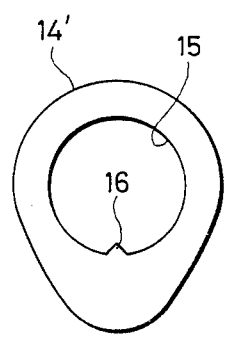
Figure 5B:
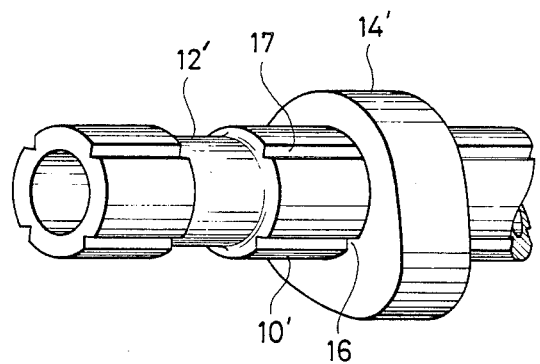

In the case where an axial groove for engaging an axial projection provided on the inner surface of the cam member 14 is formed in the outer surface of the steel pipe 10 as disclosed, for example, in Japanese Patent Publication (OPI) No. 33302/85, an axial groove may remain in the journal portion 12 after the journal portion has been formed, causing the splashing of oil and preventing the smooth rotation of the pipe. In such case, it would be necessary to cut the pipe to a depth so that the axial groove in the journal portion is eliminated. That is, as shown in FIGS. 5(a) and 5(b), the cam member 14' is formed with a bore 15 in which an axial projection 16 projects radially inwardly. The pipe 10' is formed with axial grooves 17 to engage the projection 16 upon assembly. In this case, the reduced diameter portion 12' which functions as a journal portion has a depth greater than the depth of the groove 16.

As described above, according to the present invention, a portion of a steel pipe is cut to form a small outer diameter portion acting directly as a journal portion, so that a journal piece is unnecessary, and whereby the weight of the entire cam shaft can be reduced, and the cam shaft can be manufactured at low cost.

What is claimed is:

1. A hollow cam shaft comprising:
    a steel pipe having an outer peripheral surface, defining an outer diameter of said steel pipe,
    a journal portion formed by cutting a portion of said outer peripheral surface, said journal portion having a uniform axial length and uniform radial depth and having an outer diameter smaller than said outer diameter of the steel pipe,
    an annular groove formed at each axial end of said journal portion,
    a cam portion assembled to a portion of said outer peripheral surface of the steel pipe adjacent said journal portion.

2. The hollow cam shaft of claim 1, wherein said journal portion is carburized.

3. The hollow cam shaft of claim 1, wherein said journal portion is quenched.

4. The hollow cam shaft of claim 1, wherein said cam portion is formed of a sintered alloy.

5. The hollow cam shaft of claim 1, wherein said steel pipe includes at least one axial groove having a radial depth, and wherein said cam portion includes a bore having an internal axial projection extending radially inward from said bore for engaging said axial groove during assembly of said cam portion with said steel pipe, the radial depth of said journal portion being greater than the radial depth of said axial groove.

* * * * *